United States Patent

Esser

[11] Patent Number: 5,813,437
[45] Date of Patent: Sep. 29, 1998

[54] PIPE FOR CONVEYING SOLIDS

[75] Inventor: Alexander Esser, Warstein, Germany

[73] Assignee: Esser-Werke GmbH & Co. KG, Warstein, Germany

[21] Appl. No.: 597,908

[22] Filed: Feb. 7, 1996

[30] Foreign Application Priority Data

Mar. 14, 1995 [DE] Germany ............... 295 04 332 U

[51] Int. Cl.⁶ .................................................. F16L 9/04
[52] U.S. Cl. ........................... 138/109; 138/177; 138/172; 285/55; 285/416
[58] Field of Search ........................ 138/109, 143, 138/155, 177, 172, 174, 178; 285/55, 286, 416

[56] References Cited

U.S. PATENT DOCUMENTS

| 3,156,489 | 11/1964 | Deringer | 138/109 X |
| 3,419,291 | 12/1968 | Tomb et al. | 138/109 X |
| 4,234,019 | 11/1980 | Hornor et al. | 138/109 |
| 4,361,336 | 11/1982 | Reeh et al. | 138/109 X |
| 5,044,670 | 9/1991 | Esser | 285/55 X |
| 5,275,440 | 1/1994 | Esser | 285/55 X |
| 5,379,805 | 1/1995 | Klemm et al. | 138/109 |

FOREIGN PATENT DOCUMENTS 3324658  8/1986  Germany .

*Primary Examiner*—Patrick F. Brinson
*Attorney, Agent, or Firm*—Friedrich Kueffner

[57] ABSTRACT

A pipe for conveying solids, particularly for conveying concrete, includes a cylindrical middle portion and a welding neck with a coupling ring flange. The welding neck has an inner layer and an outer layer, wherein the inner layer is of a material which has a greater resistance to wear than the outer layer. The inner layer and the outer layer have end faces which extend in a common transverse plane. The inner layer is of ceramic material or of cast material resistant to wear by impacts, such as, Ni-hard IV, and the entire surface of the inner layer is glued into an internal groove of the coupling ring flange.

7 Claims, 1 Drawing Sheet

PIPE FOR CONVEYING SOLIDS

BACKGROUND OF THE INVENTION

1. Field of the Invention

The present invention relates to a pipe for conveying solids, particularly for conveying concrete.

2. Description of the Related Art

A pipe for conveying solids known from German Patent DE-PS 33 24 658 is composed of a cylindrical middle portion and double-layer welding necks at the ends of the middle portion. The cylindrical middle portion may consist of a single layer. However, the middle portion preferably has two layers, wherein the inner layer is of a hardenable carbon steel and the outer layer is of a wrought steel. The welding necks are also constructed of two layers. The inner layer is of a material which has a greater resistance to wear than the outer layer. The inner and outer layers have the same length and their end faces extend in the same transverse plane. The coupling ring flange of the welding neck may be an integral component of the outer layer. However, the coupling ring flange may also be welded to the outer layer.

The known pipe described above has been successfully used for conveying solids in underground operations as well as in marine pipe systems, such as siphons, etc.

If concrete is transported with a pipe of this type, an increased wear occurs at the inlet side of the pipe even though the inner layer of the welding neck is of a material with increased resistance to wear. One reason for the disproportionate wear at the inlet end of the pipe is the play between two frontally abutting pipes in connection with the circumferential pipe coupling which permits this play. The play leads to radial misalignments of two abutting pipes which causes the concrete to impact against the end face areas of the downstream pipe in conveying direction.

Another reason for this disproportionate wear is that, in practical use, pipes of one manufacturer are combined with cast bends, conical pipes or siamese joints of other manufacturers. This also produces the result, even when the diameter differences of the coupled pipes are initially only small, that an increased wear occurs at the wear-resistant inner layers of the welding necks because of the different resistances to wear of successive pipes. Depending on the position of the coupled pipes in relation to the pipe axis of the respectively other pipe, this means that already after a relatively short time the area of the inner layer of the welding neck on the inlet side wears off up to near the softer outer layer.

Another property of the known pipe for conveying solids is the fact that the end faces of the cylindrical middle portion must be machined precisely in order to ensure that, after the middle portion and the welding necks have been connected, the gaps between these components are narrow. This is because narrow gaps mean that the required ceiling rings have small volumes; these ceiling rings have the purpose of preventing, when welding the welding necks to the cylindrical middle portion, the cooling water required for maintaining the hardness of the inner pipe during welding cannot penetrate to the welding point and, consequently, impair the quality of the welding seam. In the past, expensive and, thus, uneconomical measures had to be taken for cutting from an endless pipe the desired lengths for the middle portions.

Also known in the art is a pipe disclosed by German Patent 38 39 582. In this pipe, the inner layer of a welding neck is replaceably clamped in the outer layer in a positively and frictionally engaging manner, so that the inner layer can be replaced by a new inner layer after the inner layer has worn off prematurely.

SUMMARY OF THE INVENTION

Therefore, it is the primary object of the present invention to provide a pipe for conveying solids of the above-described type in which at least the end portion of the pipe on the inlet side has such a resistance to wear that, independently of the type and service life of the pipe element connected upstream in conveying direction, i.e., a cast bend, a conical pipe, a siamese joint, the end portion reaches the full service life of the pipe in the middle portion, particularly when conveying concrete.

In accordance with the present invention, the inner layer of the welding neck is of a ceramic material or a cast material which is resistant to wear by impacts, and the inner layer of the welding neck is glued over the full surface thereof in an internal groove of the coupling ring flange.

By constructing the inner layer of a ceramic material or a cast material which is resistant to wear by impacts, it is now possible to adapt a pipe easily to the conveying element which is connected upstream, such as a cast bend, a conical pipe or a siamese joint.

By gluing the inner layer over the entire surface thereof in the outer layer and by filling out all gaps with the adhesive compound, it is additionally ensured that especially sensitive ceramic material cannot burst even when impact-like loads occur.

Another advantage of the measure according to the present invention is the fact that, in accordance with a preferred embodiment, the cylindrical middle portion of the pipe, be it a single-layer or a double-layer pipe, can be pushed deep into the welding neck up to contacting the inner layer during the assembly and prior to the welding procedure.

In this manner, the gap between the inner layer and the middle portion is spaced apart significantly from the welding point. This great distance between the gap and the welding point alone essentially prevents any flow of the cooling water to the welding point during welding without requiring additional auxiliary means. Also, because of the great distance from the welding point, a sealing member which is advantageously placed in the gap is then also not subjected to high thermal loads. Cooling water cannot reach the welding point during welding. The desired quality of the welding seam for securing the welding neck to the cylindrical middle portion is ensured in the best possible manner.

When the inner layer is constructed of cast material resistant to wear by impact, the inner layer is preferably of Ni-hard IV.

In accordance with another feature of the present invention, the outer layer of the welding neck has two to three times the length of the inner layer.

In accordance with an advantageous further development of the present invention, a sealing member is provided between the inner layer of ceramic material and the cylindrical middle portion. This feature provides the advantage that the cylindrical middle portion can be cut from an endless pipe by using economical processes. For example, the plasma cutting method can be used. This method produces relatively irregular cut surfaces, however, the method can be carried out with very economical means particularly in the case of a double-layer pipe with hardened inner pipe. The elastic sealing member serves to compensate between the irregular end face of the middle portion and the end face of the inner layer of the welding neck and, consequently, ensures that, when the welding neck is welded to the middle portion, cooling water cannot reach the welding point and impair the quality of the welding seam.

The various features of novelty which characterize the invention are pointed out with particularity in the claims annexed to and forming a part of the disclosure. For a better understanding of the invention, its operating advantages, specific objects attained by its use, reference should be had to the drawing and descriptive matter in which there are illustrated and described preferred embodiments of the invention.

DETAILED DESCRIPTION OF THE PREFERRED EMBODIMENTS

Figure 1:
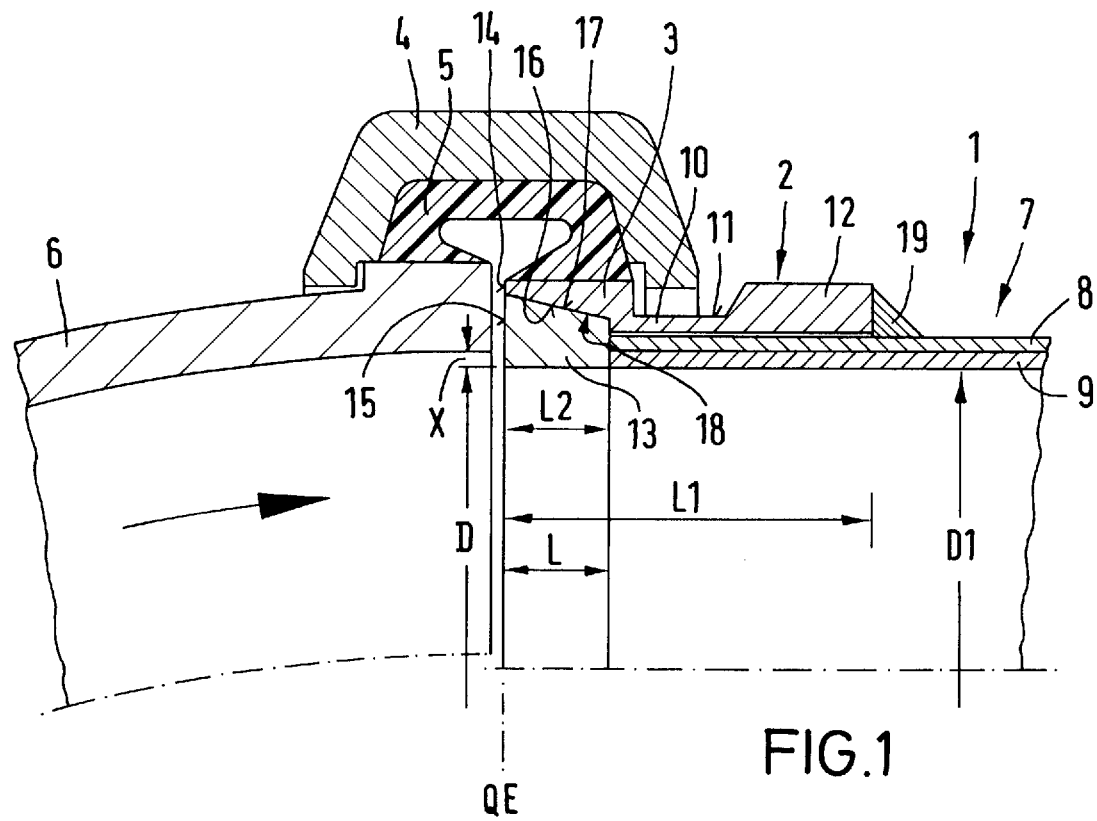
FIG. 1 is a partial longitudinal sectional view showing the transition from a cast bend to a straight pipe for conveying concrete.
Figure 2:
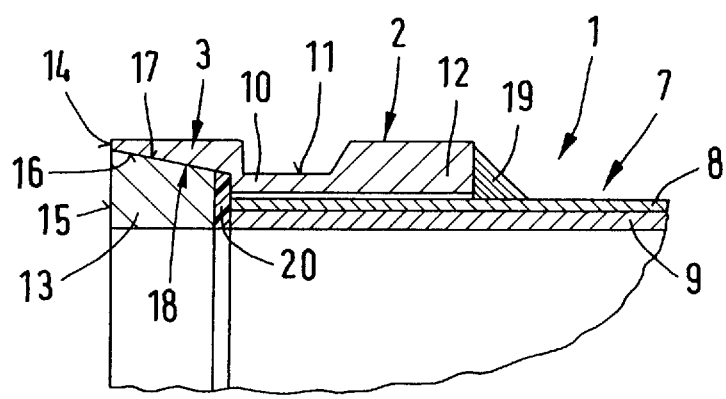
FIG. 2 is also a partial longitudinal sectional view of another embodiment showing the end portion of a straight pipe for conveying concrete.

FIGS. 1 and 2 of the drawing show a pipe bend 1 for conveying concrete. The pipe is used, for example, for conveying concrete from a concrete mixing machine or a concrete truck to a point of use. Such a pipe 1 can be connected to other pipes 1 to form a pipeline by means of welding necks 2 with coupling ring flanges 3 mounted at the ends of the pipes and by means of couplings 4 and sealing members 5 engaging over the coupling ring flanges 3. This configuration is also used for coupling straight pipes 1 to conical pipes, siamese joints or, as illustrated by way of example in FIG. 1, to cast bends 6.

For example, when a cast bend 6 is connected to the pipe 1, it may happen, as illustrated in FIG. 1, that the inlet side of the pipe 1 is radially offset by the dimension X relative to the cast bend 6. This inevitably leads to an increased wear at the inlet side of the pipe 1. The reasons for the radially offset arrangement of the pipe 1 relative to the cast bend 6 may be due to the front-to-front joining without projections of a pipe 1 to another pipe 1 or to a cast bend 6 for making the pipe 1 replaceable within a closed pipeline in connection with the play between the couplings 4 and the pipes 1 or a cast bend 6, on the one hand, and because of possible initial differences of the inner diameters of the abutting pipe elements 1, 6, on the other hand.

The pipe 1 shown in FIGS. 1 and 2 has a double-layer cylindrical middle portion 7. The outer pipe 8 is of a tough material, such as, wrought steel, while the inner pipe 9 is of flame-hardened material. The outer pipe 8 and the inner pipe 9 are pressed together, for example, by hardening and have equal lengths.

The welding neck 2 which is approximately L-shaped in the vertical longitudinal section is also constructed of two layers. The outer layer 10 with the coupling ring flange 3, the coupling groove 11 and the welding flange 12 is of wrought steel while the inner layer 13 is of a ceramic material which has a greater resistance to wear than the material of the outer layer 10.

The end faces 14, 15 of the outer layer 10 and the inner layer 13 extend in the same transverse plane QE. However, FIGS. 1 and 2 show that the ratio of the length L of the inner layer 13 to the length L1 of the outer layer 10 is approximately 1:3. FIGS. 1 and 2 additionally show that the inner layer 13 is inclined in longitudinal direction of the pipe at the outer circumference 17 in the manner of a roof and is glued over the full surface thereof into a corresponding internal groove 18 with an inclined circumference 16 of the outer layer 10. The length L of the inner layer 13 corresponds to the length L2 of the internal groove 18. The inner diameter D of the inner layer 13 corresponds to the inner diameter of the inner tube 9.

Because of the L-shaped configuration of the welding neck 2, the short side of the L being essentially formed by the inner layer 13, the middle portion 7 can be pushed up until it contacts the inner layer 13. The outer layer 10 forming the long side of the L engages over the middle portion 7. Subsequently, the outer pipe 8 of the middle portion 7 is welded to the welding flange 12 of the welding neck 2. During this process, the inner tube 9 of the middle portion 7 must be cooled; cooling is effected by means of cooling water. For this purpose, a sealing member is usually placed between the inner layer 13 and the middle portion 7, so that the sealing member prevents cooling water from reaching the welding point and impairing the quality of the welding seam 19. This sealing member is not illustrated in FIG. 1.

In the embodiment of FIG. 2, a relatively soft sealing member 20 is placed between the inner layer 13 of ceramic material and the cylindrical middle portion 7. During welding of the welding collar 2 to the middle portion 7, the sealing member 20 serves to ensure that flow of cooling water to the welding point 19 is prevented.

The sealing member 20 also makes it possible that the middle portion 7 can be cut from a longer pipe section by means of an economical cutting method, for example, plasma cutting, because the sealing member 20 serves to compensate for any irregularities on the end face of the middle portion 7, so that leaks between the inner layer 13 and the middle portion 7 after welding cannot occur.

While specific embodiments of the invention have been shown and described in detail to illustrate the inventive principles, it will be understood that the invention may be embodied otherwise without departing from such principles.

I claim:

1. In a pipe for conveying solids, the pipe including a cylindrical middle portion having ends, a welding neck with a coupling ring flange welded onto the ends of the middle portion, the welding neck having an inner layer and an outer layer, wherein the inner layer is of a material which has a greater resistance to wear than the outer layer, the inner layer and the outer layer having end faces, the end faces of the inner layer and the outer layer extending in a common transverse plane, the improvement comprising the inner layer being of ceramic material, and further comprising a glued connection of an entire surface of the inner layer in an internal groove of the coupling ring flange.

2. The pipe according to claim 1, wherein the outer layer and the inner layer each have a length, and wherein the length of the outer layer is two to three times the length of the inner layer.

3. The pipe according to claim 1, further comprising an elastic sealing member mounted between the inner layer and the cylindrical middle portion.

4. In a pipe for conveying solids, the pipe including a cylindrical middle portion having ends, a welding neck with a coupling ring flange welded onto the ends of the middle portion, the welding neck having an inner layer and an outer layer, wherein the inner layer is of a material which has a greater resistance to wear than the outer layer, the inner layer and the outer layer having end faces, the end faces of the inner layer and the outer layer extending in a common transverse plane, the improvement comprising the inner layer being of cast material resistant to wear by impacts, and further comprising a glued connection of an entire surface of the inner layer in an internal groove of the coupling ring flange.

5. The pipe according to claim 4, wherein the cast material is Ni-hard IV.

6. The pipe according to claim 4, wherein the outer layer and the inner layer each have a length, and wherein the length of the outer layer is two to three times the length of the inner layer.

7. The pipe according to claim 4, further comprising an elastic sealing member mounted between the inner layer and the cylindrical middle portion.

* * * * *